United States Patent
Yu et al.

(10) Patent No.: US 8,650,421 B2
(45) Date of Patent: Feb. 11, 2014

(54) NETWORK INTERFACE APPARATUS AND RELATED POWER SAVING METHOD THEREOF

(75) Inventors: Ting-Fa Yu, Yunlin County (TW); Li-Wei Fang, Taichung County (TW); Tsung-Cheng Lee, Yunlin County (TW); Chien-Sheng Lee, Miaoli County (TW)

(73) Assignee: Realtek Semiconductor Corp., Hsinchu (TW)

( * ) Notice: Subject to any disclaimer, the term of this patent is extended or adjusted under 35 U.S.C. 154(b) by 696 days.

(21) Appl. No.: 12/658,529

(22) Filed: Feb. 10, 2010

(65) Prior Publication Data
US 2010/0218028 A1    Aug. 26, 2010

(30) Foreign Application Priority Data
Feb. 20, 2009    (TW) ................................ 98105391 A

(51) Int. Cl.
*G06F 1/32*    (2006.01)

(52) U.S. Cl.
USPC ............ 713/321; 713/322; 713/323; 713/324

(58) Field of Classification Search
USPC .................................................. 713/321–324
See application file for complete search history.

(56) References Cited

U.S. PATENT DOCUMENTS

| | | | |
|---|---|---|---|
| 6,618,814 B1 * | 9/2003 | Gaur et al. ..................... | 713/323 |
| 6,952,784 B1 * | 10/2005 | Miller ........................... | 713/300 |
| 7,392,412 B1 * | 6/2008 | Lo ................................. | 713/320 |
| 7,814,354 B2 * | 10/2010 | Tran et al. ..................... | 713/324 |
| 7,903,622 B2 * | 3/2011 | Huang .......................... | 370/338 |
| 7,937,600 B1 * | 5/2011 | Lo ................................. | 713/323 |
| 2005/0063348 A1 * | 3/2005 | Donovan ...................... | 370/338 |

* cited by examiner

*Primary Examiner* — Thuan Du
(74) *Attorney, Agent, or Firm* — McClure, Qualey & Rodack, LLP

(57) ABSTRACT

The present invention discloses a network interface apparatus comprising two power regulators, one of which is a system power regulator for supplying a first supply voltage to a physical layer and a medium access control layer in the network interface apparatus, and the other one is an uninterrupted power regulator for supplying a second supply voltage to a power management module. When the network interface apparatus operates in a disconnection status, the system power regulator is disabled so as not to supply the first supply voltage, and the uninterrupted power regulator still provides the second supply voltage to the power management module.

20 Claims, 2 Drawing Sheets

NETWORK INTERFACE APPARATUS AND RELATED POWER SAVING METHOD THEREOF

BACKGROUND OF THE INVENTION

1. Field of Invention

The present invention relates to a network interface apparatus; particularly, it relates to a network interface apparatus with power saving function and a related power saving method thereof.

2. Description of Related Art

An electronic device or a computer system is often required to communicate with other devices or equipments via network. To connect to the network, such electronic device is provided with a network interface apparatus as an interface for connection with the network.

When the electronic device is in use, the network interface apparatus maybe operated in a disconnection status, or in a connection status but no data packet is being transmitted. Under such circumstance, if the network interface apparatus is still in a high power consumption mode, it is a waste of power.

Therefore, for saving power, the prior art reduces a voltage supplied by a system power regulator when the network interface apparatus is not connected to network (disconnection status). However, there is only one system power regulator to supply power in the prior art, and therefore the power supplied by the system power regulator can not be reduced too much, nor can it be completely turned off. Thus, even when the network interface apparatus operates in a disconnection status, the power consumption of the entire circuit is still not satisfactory.

SUMMARY OF THE INVENTION

In view of the foregoing, the present invention provides a network interface apparatus capable of saving unnecessary power consumption effectively.

According to the present invention, a network interface apparatus comprises: a physical layer for receiving a packet in a network; a medium access control layer coupled to the physical layer for processing the packet received by the physical layer to output a processed signal; a power management module for detecting a network connection status to generate a detection result, and generating a power control signal according to the detection result; a first regulator coupled to the physical layer and the medium access control layer for supplying a first supply voltage to the physical layer and the medium access control layer according to the power control signal; and a second regulator coupled to the power management module for supplying a second supply voltage to the power management module; wherein when the power management module detects that the network connection is operated in a disconnection status, it controls the first regulator such that the first supply voltage is lower than the second supply voltage.

The objectives, technical details, features, and effects of the present invention will be better understood with regard to the detailed description of the embodiments below, with reference to the drawings.

DESCRIPTION OF THE PREFERRED EMBODIMENTS

The following description discloses specific details in order to better illustrate the present invention. Those skilled in this art can readily conceive variations and modifications within the spirit of the present invention without following such details.

Figure 1:
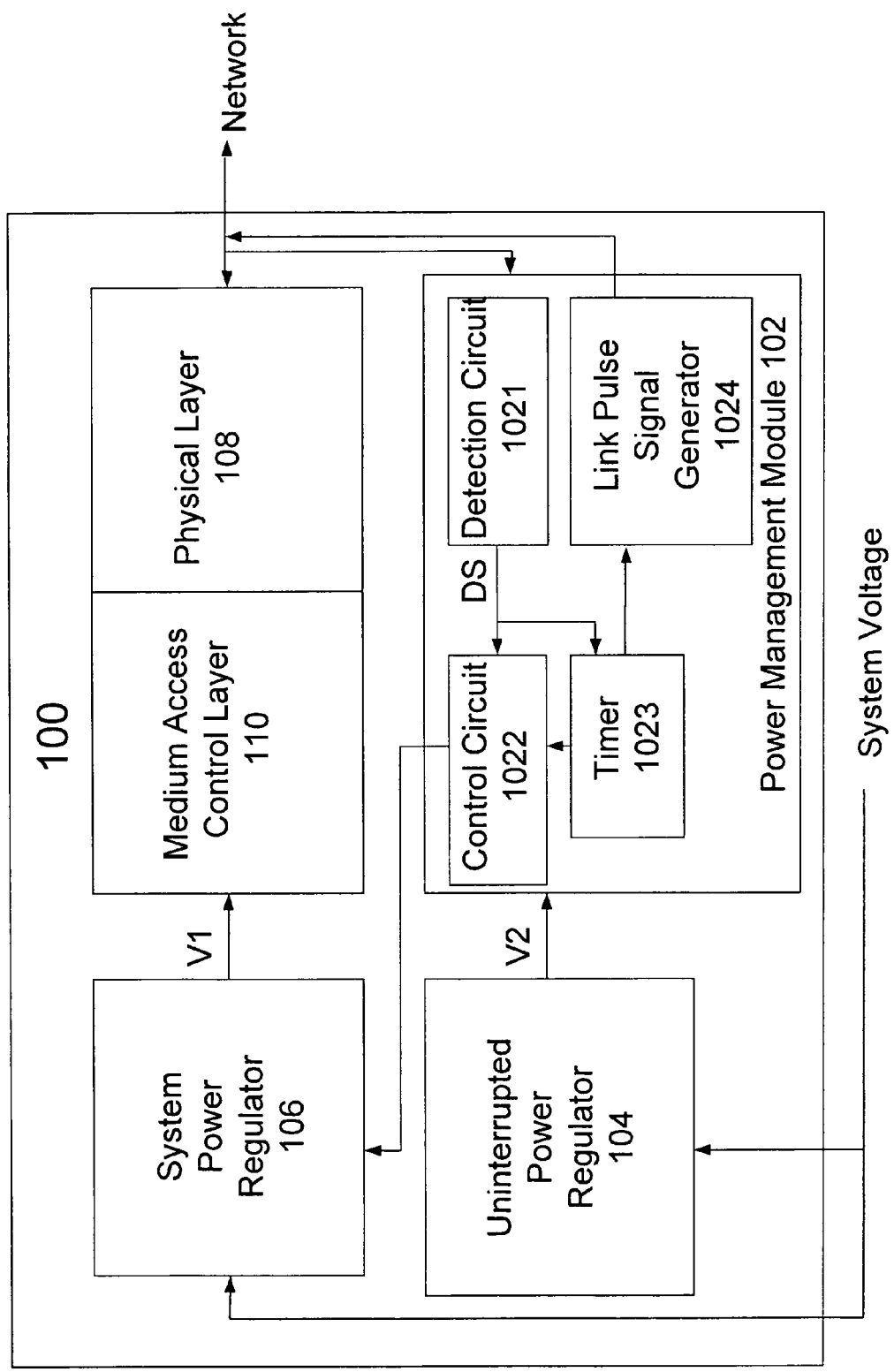
FIG. 1 shows a network interface apparatus with power saving function according to the present invention.

FIG. 1 shows a network interface apparatus 100 with power saving function according to the present invention.

As shown in FIG. 1, the network interface apparatus 100 comprises a power management module 102, an uninterrupted power regulator 104, a system power regulator 106, a physical layer 108, and a medium access control layer 110.

The physical layer 108 receives a packet in the network, and transmits the packet to the medium access control layer 110. The medium access control layer 110 decodes the packet, and transmits the processed signals in the packet to a higher system.

The system power regulator 106 receives a system voltage such as 3.3V and converts it to an operation voltage V1 (e.g., 1.2V) which is supplied to the devices in the network interface apparatus 100. The uninterrupted power regulator 104 also receives the system voltage (e.g., 3.3V) and converts it to an operation voltage V2 (e.g., 1.2V) required by the power management module 102. According to one embodiment of the present invention, for cost saving, the system power regulator 106 and the uninterrupted power regulator 104 can be integrated in the same chip, that is, both the system power regulator 106 and the uninterrupted power regulator 104 are arranged in the network interface apparatus 100. However, the present invention is not limited to such embodiment; the system power regulator 106 and the uninterrupted power regulator 104 can be located outside of the network interface apparatus 100 as well.

When the network interface apparatus 100 of the present invention is operated in a normal operation mode, the operation voltage V1 for the physical layer 108 and the medium access control layer 110 is supplied by the system power regulator. When or after the network interface apparatus 100 enters a power saving mode, the system power regulator 106 lowers the operation voltage V1 or is turned off; however, the uninterrupted power regulator 104 still keeps providing the operation voltage V2 to the power management module 102.

In one embodiment, the power management module 102 includes a detection circuit 1021 and a control circuit 1022. The detection circuit 1021 is used for detecting a link pulse signal from the network, to determine whether the network is presently in connection status or disconnection status, and outputs a detection result DS to the control circuit 1022. The control circuit 1022 is used for generating a power control signal to control the system power regulator 106 according to the detection result DS for saving power consumption by the network interface apparatus 100.

More specifically, if no link pulse signal from the network is detected by the detection circuit 1021, indicating that the network is operated in a disconnection status, the control circuit 1022 controls the system power regulator 106 (and thus the operation voltage V1) so that the system enters the power saving mode. On the other hand, if a link pulse signal from the network is detected by the detection circuit 1021, indicating that the network is operated in a connection status, the control circuit 1022 controls the system power regulator 106 so that the operation voltage V1 resumes to its normal operation mode.

To reduce the power consumption more effectively, in one embodiment, when the network interface apparatus enters the power saving mode, the difference between the operation voltage V1 supplied by the system power regulator 106 and the operation voltage V2 supplied by the uninterrupted power regulator 104 is 1V or more. In other words, the operation voltage of the system power regulator 106 is reduced from V1 (e.g., 1.2V) to V2 (e.g., 0.2V or even lower). Moreover, the system power regulator 106 can even be disabled, so that no power (0V) is supplied to the physical layer 108 and the medium access control layer 110. When the system power regulator 106 is disabled, it almost does not consume any power. As such, the power consumption of the entire network interface apparatus 100 can be greatly reduced.

According to the present invention, in one embodiment, the system power regulator 106 and the uninterrupted power regulator 104 can be embodied by different circuits. For example, the system power regulator 106 can be embodied by a switching regulator, and the uninterrupted power regulator 104 can be embodied by a linear regulator. According to one embodiment of the present invention, the linear regulator outputs an operation voltage 1.2V with very small current (e.g., smaller than 10 mA), so the power consumption of the linear regulator is less than that of the switching regulator. Thus, when the network interface apparatus 100 enters the power saving mode, the uninterrupted power regulator 104 only consumes very small amount of power to provide the operation voltage V2 to the power management module 102, so as to save power more effectively.

Furthermore, in one embodiment of the present invention, the power management module 102 can further includes a timer 1023 to count the period that the system power regulator 106 is disabled. In other words, when the period that the system power regulator 106 is disabled is longer than a predetermined threshold, the control circuit 1022 enables the system power regulator 106 so that the system power regulator 106 resumes to supply power to the physical layer 108; thereby, the physical layer 108 periodically issues a link pulse signal to an external device to inform the external device that the network interface apparatus 100 is still in a connection status.

Or, in another embodiment of the present invention, the power management module 102 includes a link pulse signal generator 1024. When the period that the system power regulator 1024 is disabled is longer than a predetermined threshold, the link pulse signal generator 1024 generates and sends a link pulse signal to the network to inform the external device that the network interface apparatus 100 is still in a connection status.

Figure 2:
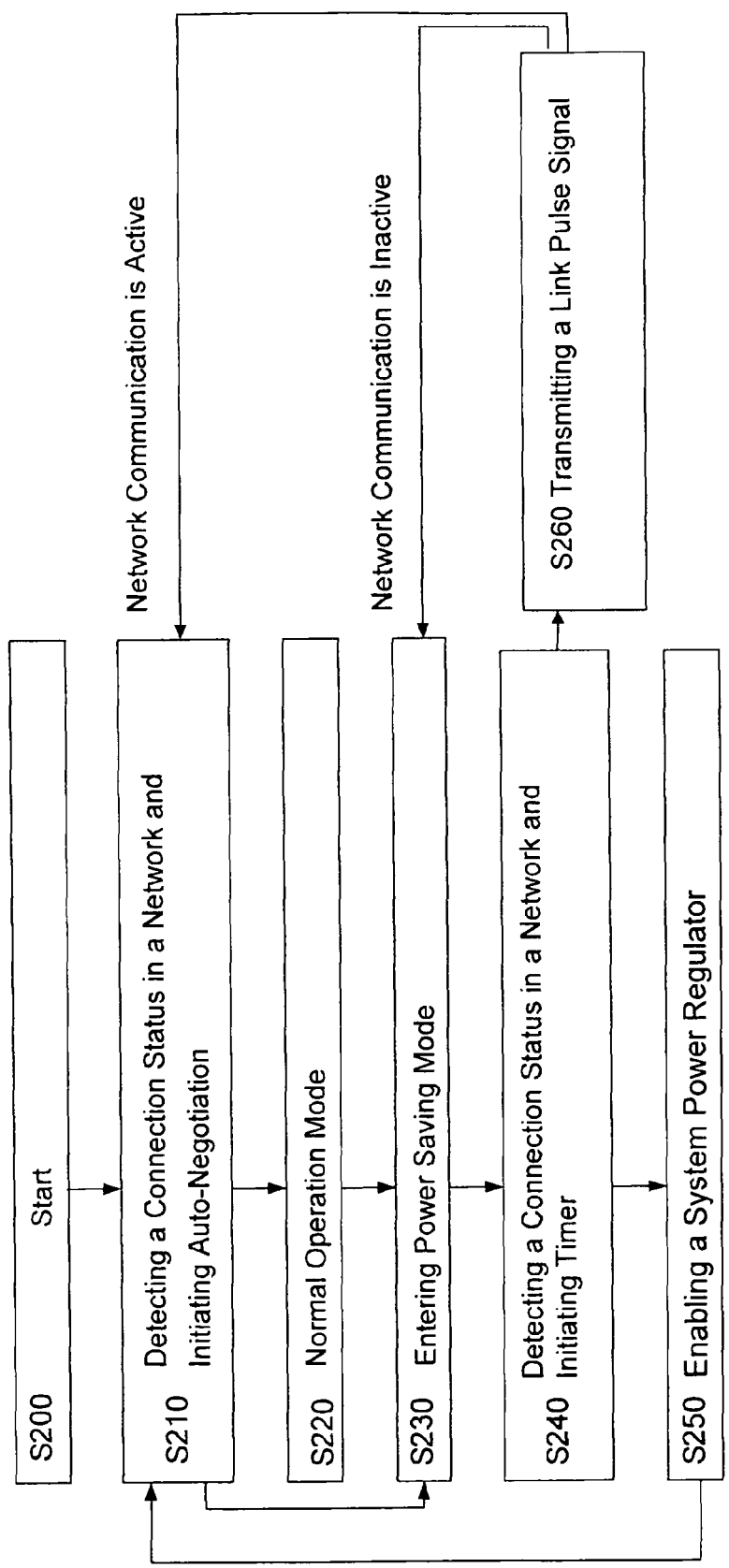
FIG. 2 is a flow chart showing one embodiment of a power saving method applied in the network interface apparatus of the present invention.

FIG. 2 is a flow chart showing one embodiment of a power saving method of the network interface apparatus of the present invention.

First, in the initialization step 200, power on reset process is completed and the system power regulator 106 and the uninterrupted power regulator 104 are enabled.

Next, in step S210, power is supplied to the physical layer 108 and the medium access control layer 110, to detect a connection status with a network and perform an auto-negotiation procedure. If it is detected that the network is operated in a connection status and the auto-negotiation procedure is successful, step S220 is taken to enter a normal operation mode. In the step 210, if it is detected that the network is operated in a disconnection status, step S230 is taken. Or, in the step 220, if a "link fail" is detected during the normal operation mode, step S230 is also taken.

In step 230, since the network is operated in a disconnection status, the network interface apparatus 100 enters a power saving mode. Thus, in the step 230, the system power regulator 106 in the network interface apparatus 100 stops providing power to the physical layer 108 and the medium access control layer 106, but the uninterrupted power regulator 104 still keeps providing power to the power management module 102 to maintain its operation.

Next, in step S240, the detection circuit 1021 keeps detecting whether there is a link pulse signal from the network, and initiates a timer 1023. When the detection circuit 1021 detects a link pulse signal, it indicates that the network connection should be resumed. Thus, step S250 is taken to enable the system power regulator 106 and next the process returns to the step S210.

If, in the step S240, the count by the timer 1023 reaches a predetermined threshold, then step S260 is taken so that a link pulse signal is transmitted to inform other devices in the network that the system 100 is still in the connection status. In this step, after the link pulse signal is transmitted, if the detection circuit 1021 detects that the network communication is active, indicating that the network connection should be resumed, then the process returns to the step S210. If the network communication is inactive, indicating that the network connection is not required and the system should stay in the power saving mode, then the process returns to the step S230 and repeats the operation after the step S230.

In step S260, according to one embodiment, the control circuit 1022 enables the system power regulator 106 to generate and send a link pulse signal to the network via the physical layer 108. In another embodiment, in the step S260, a link pulse generator 1024 generates the link pulse signal. Yet, the present invention is not limited to these two embodiments.

As described in the above, the present invention uses two regulators in the network interface apparatus 100, wherein one regulator is the system power regulator 106 for supplying power to the physical layer 108 and the medium access control layer 110, and this regulator can be enabled/disabled; and the other regulator is the uninterrupted power regulator 104 for supplying uninterrupted power to the power management module 102. As such, when the network interface apparatus 100 operates in the power saving mode, the system power regulator 106 which consumes more power is turned off and the power consumption can be greatly reduced. In the mean time, the uninterrupted power regulator 104 supplies power to the power management module 102 to keep detecting whether there is a packet from the network, and to periodically send a link pulse signal to external devices to inform the external devices that the network interface apparatus 100 is still in a connection status. As such, the present invention can effectively save unnecessary power consumption in comparison with the prior art.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A network interface apparatus, comprising:
   a physical layer for receiving a packet in a network;
   a medium access control layer coupled to the physical layer for processing the packet received by the physical layer to output a processed signal;
   a power management module for detecting a network connection status to generate a detection result, and generating a power control signal according to the detection result;
   a first regulator coupled to the physical layer and the medium access control layer for supplying a first supply voltage to the physical layer and the medium access control layer according to the power control signal; and
   a second regulator coupled to the power management module for supplying a second supply voltage to the power management module;
   wherein when the power management module detects that the network connection is operated in a disconnection status, it controls the first regulator such that the first supply voltage is lower than the second supply voltage, the first and second regulators configured to provide the first and second supply voltages at the same time when the network connection is operated in the disconnection status.

2. The network interface apparatus of claim 1, wherein when the network connection is operated in the disconnection status, the power management module disables the first regulator to stop supplying the first supply voltage to the physical layer and the medium access control layer.

3. The network interface apparatus of claim 1, wherein the power management module includes:
   a timer for counting a disabled period of the first regulator;
   a link pulse signal generator coupled to the timer to output a link pulse signal according to the disabled period;
   wherein when the disabled period is longer than a predetermined period, the link pulse signal generator generates the link pulse signal which is sent to the network.

4. The network interface apparatus of claim 1, wherein the second regulator is an uninterrupted power regulator.

5. The network interface apparatus of claim 1, wherein the first regulator and the second regulator are provided in the same chip.

6. The network interface apparatus of claim 1, wherein the first regulator is a switching regulator and the second regulator is a linear regulator.

7. The network interface apparatus of claim 1, wherein power consumption of the first regulator and power consumption of the second regulator are different.

8. The network interface apparatus of claim 1, wherein when the network connection is operated in a connection status, the first supply voltage supplied by the first regulator is equal to the second supply voltage supplied by the second regulator.

9. A power saving method for use in a network interface apparatus, the network interface apparatus including a physical layer, a medium access control layer, a power management module, a first regulator, and a second regulator, the power saving method comprising:
   receiving a packet in a network by the physical layer;
   processing the packet received by the physical layer to output a processed signal by the medium access control layer;
   detecting a network connection status, and generating a power control signal according to the detection result by the power management module;
   supplying a first supply voltage to the physical layer and the medium access control layer by the first regulator according to the power control signal;
   supplying a second supply voltage to the power management module by the second regulator;
   wherein when the power management module detects that the network connection is operated in a disconnection status, it controls the first regulator such that the first supply voltage is lower than the second supply voltage.

10. The method of claim 9, wherein when the network connection is operated in the disconnection status, a voltage difference between the first supply voltage supplied by the first regulator and the second supply voltage supplied by the second regulator is at least 1V.

11. The method of claim 9, wherein when the network connection is operated in the disconnection status, the power management module disables the first regulator to stop supplying the first supply voltage to the physical layer and the medium access control layer.

12. The method of claim 9 further comprising:
   counting a disabled period of the first regulator;
   outputting a link pulse signal to the network according to the disabled period.

13. The method of claim 9, wherein the second regulator is an uninterrupted power regulator.

14. The method of claim 9, wherein the first regulator is a switching regulator and the second regulator is a linear regulator.

15. The method of claim 9, wherein power consumption of the first regulator and power consumption of the second regulator is different.

16. The method of claim 9, wherein power consumption of the second regulator is lower than power consumption of the first regulator.

17. A network interface apparatus, comprising:
   a physical layer for receiving a packet in a network;
   a medium access control layer coupled to the physical layer for processing the packet received by the physical layer to output a processed signal;
   a power management module for detecting a network connection status to generate a detection result, and generating a power control signal according to the detection result;
   a first regulator coupled to the physical layer or the medium access control layer for supplying a first supply voltage to the physical layer or the medium access control layer according to the power control signal; and
   a second regulator coupled to the power management module for supplying a second supply voltage to the power management module;
   wherein when the power management module detects that the network connection is operated in a disconnection status, the power management module disables the first regulator to stop supplying the first supply voltage to the physical layer or the medium access control layer.

18. The network interface apparatus of claim 17, wherein the first regulator is a switching regulator and the second regulator is a linear regulator.

19. The network interface apparatus of claim 17, wherein the second regulator is an uninterrupted power regulator.

20. The network interface apparatus of claim 17, wherein the power management module includes:
   a timer for counting a disabled period of the first regulator;
   a link pulse signal generator coupled to the timer to output a link pulse signal according to the disabled period;

wherein when the disabled period is longer than a predetermined period, the link pulse signal generator generates the link pulse signal to the network.

\* \* \* \* \*